(12) United States Patent
Bhat

(10) Patent No.: US 12,143,687 B2
(45) Date of Patent: *Nov. 12, 2024

(54) PAUSING NATIVE MEDIA STREAMING FOR EXTENDED PERIODS OF TIME USING DUMMY MEDIA SEGMENTS

(71) Applicant: DISH Network Technologies India Private Limited, Karnataka (IN)

(72) Inventor: Talapady Madhav Narayan Bhat, Bangaluru (IN)

(73) Assignee: DISH Network Technologies India Private Limited (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,337

(22) Filed: May 23, 2023

(65) Prior Publication Data

US 2023/0291979 A1    Sep. 14, 2023

Related U.S. Application Data

(63) Continuation of application No. 17/446,140, filed on Aug. 26, 2021, now Pat. No. 11,689,777.

(30) Foreign Application Priority Data

Aug. 27, 2020   (IN) .............................. 202041036988

(51) Int. Cl.
*H04N 7/173*     (2011.01)
*H04L 65/1069*   (2022.01)
(Continued)

(52) U.S. Cl.
CPC ..... *H04N 21/6587* (2013.01); *H04L 65/1069* (2013.01); *H04L 65/1083* (2013.01);
(Continued)

(58) Field of Classification Search
CPC ............ H04N 21/6587; H04N 21/437; H04N 21/6125; H04N 21/8456; H04N 21/23439;
(Continued)

(56) References Cited

U.S. PATENT DOCUMENTS 9,716,856 B2    7/2017 Lynch et al.
2008/0195743 A1   8/2008 Brueck et al.
(Continued)

FOREIGN PATENT DOCUMENTS

EP    2130399 B1 * 10/2012    ............ H04W 92/20
JP    2005005986 A  *  1/2005

OTHER PUBLICATIONS

Kusogami, a translation version of JP-2005005986-A, Jan. 6, 2005 (Year: 2005).*

*Primary Examiner* — Gigi L Dubasky
(74) *Attorney, Agent, or Firm* — KW Law, LLP

(57) ABSTRACT

Media streaming connections are maintained even when media playback is paused or otherwise temporarily halted through the use of dummy segments that are delivered via the media streaming connection, thereby preventing non-use of the connection. In some implementations, the dummy segments are requested by the media client device. In other implementations, dummy segments are transmitted by the media server device when no other requests are received, when notification of paused playback is received, or when conditions otherwise warrant. The dummy segments may be relatively blank, contain redundant imagery, or otherwise be easily compressible to reduce bandwidth consumption on the network. Received dummy segments are recognized and discarded by the media player device, as appropriate.

12 Claims, 2 Drawing Sheets

(51) Int. Cl.
  *H04L 65/1083* (2022.01)
  *H04L 67/025* (2022.01)
  *H04N 21/437* (2011.01)
  *H04N 21/61* (2011.01)
  *H04N 21/6587* (2011.01)
  *H04N 21/845* (2011.01)

(52) U.S. Cl.
  CPC ......... *H04L 67/025* (2013.01); *H04N 21/437* (2013.01); *H04N 21/6125* (2013.01); *H04N 21/8456* (2013.01)

(58) Field of Classification Search
  CPC . H04N 21/2387; H04L 65/612; H04L 65/613; H04L 65/65; H04L 65/1069; H04L 65/1083
  See application file for complete search history.

(56) References Cited

U.S. PATENT DOCUMENTS

| | | | |
|---|---|---|---|
| 2011/0119325 A1 | 5/2011 | Paul et al. | |
| 2015/0271231 A1* | 9/2015 | Luby | H04L 65/60 709/231 |
| 2016/0360556 A1 | 12/2016 | Jeong et al. | |
| 2017/0359613 A1 | 12/2017 | Hedhli et al. | |
| 2020/0084509 A1 | 3/2020 | Krishnadoss et al. | |
| 2020/0213200 A1 | 7/2020 | Ranganathan et al. | |

\* cited by examiner

PAUSING NATIVE MEDIA STREAMING FOR EXTENDED PERIODS OF TIME USING DUMMY MEDIA SEGMENTS

PRIORITY CLAIM

This application is a continuation of U.S. application Ser. No. 17/446,140 filed on Aug. 26, 2021, which claims priority to India Provisional Application Serial No. 202041036988 filed on Aug. 27, 2020. Both of these applications are incorporated herein by reference.

TECHNICAL FIELD

The following discussion generally relates to streaming of digital media over the Internet or another digital network. More particularly, the following discussion relates to communications between a media server device and a media client device via a digital network. Various embodiments may be used in connection with media players, digital video recorder (DVR) devices, video game players and/or any other devices that interoperate with placeshifting devices and/or other devices on a network.

BACKGROUND

Viewers now obtain television and other media content from a wide array of devices and sources. Media streaming is increasingly replacing broadcast television, and time and place shifting devices are becoming increasingly common in homes, offices and other settings. The digital video recorder (DVR), for example, allows television viewers to record television programming or other content for viewing at a later time. Place shifting devices allow live and/or pre-recorded programs to be encoded for efficient delivery over local and/or wide area networks for viewing on a phone, tablet, computer or other device at a remote location from the place that the content is received or stored. Other media devices that are becoming increasingly commonplace include streaming media receivers and video game players, as well as set top boxes (STBs) and other receivers for terrestrial, cable, internet and/or direct broadcast satellite (DBS) television programming. Computers (including mobile phones, tablets and other portable computers) can also act as media devices.

One problem that arises during some media streaming sessions relates to periods of relative inactivity. If the connection between the client and server devices is not used for a period of time, the streaming protocol may assume that a problem has occurred, or that the user no longer wishes to continue streaming. In such cases, the connection can be undesirably terminated, thereby leading to delay and annoyance as the connection is re-established.

It is therefore desirable to create devices, systems and processes to effectively yet efficiently maintain media streaming connections via the network. Other desirable features and characteristics will become apparent from the subsequent detailed description and the appended claims, taken in conjunction with the accompanying drawings and this background section.

BRIEF SUMMARY

According to various examples, client and server devices maintain video or other media streaming connections even during periods of relative inactivity (e.g., while the media playback is paused or otherwise temporarily halted) through the use of dummy media segments. To prevent the media connection from terminating prematurely, "dummy" segments are sent from the server to the client device at regular and/or irregular intervals, thereby preventing periods of inactivity that could otherwise lead to termination of the connection. In one example, a media player requests "dummy" segments every few seconds or so while the playback is paused. These requests for "dummy" segments are handled by the server device to supply a segment that can traverse the data connection, thereby preventing inactivity. The client device recognizes the dummy segments and discards them, as appropriate, while maintaining the streaming connection. In various further embodiments, the "dummy" segments are designed to be relatively low bandwidth, and/or easily compressible.

Some example embodiments provide an automated process performed by a media player device to play a media stream received from a media server device via a digital network. The automated process typically involves a processor of the media player device executing computer-executable instructions that are stored on a solid-state memory, disk drive and/or other non-transitory data storage. The automated process suitably comprises: initially establishing a media streaming connection via the digital network between the media client device and the media server device for delivery of the media stream, wherein the media stream comprises a series of media segments each requested from the media server device by the media client device and delivered from the media server device to the media client device via the digital network; receiving a user instruction by the media player device to pause playback of a media stream delivered via the media streaming connection; in response to the user instruction, the media player device notifying the media server device of the paused playback via the media streaming connection; receiving, by the media player device, one or more dummy media segments to thereby continue activity on the media streaming connection while the playback of the media stream remains paused; and discarding the dummy media segment by the media player device.

Other example embodiments provide a media player device to play a media stream received from a media server device via a digital network. The media player device typically includes a processor, a memory or other non-transitory data storage, and input/output interfaces for network communications and user interaction. The processor of the media player device suitably executes computer-executable instructions that are stored on the non-transitory data storage to perform an automated process as described herein. In one embodiment, the automated process suitably comprises: initially establishing a media streaming connection via the digital network between the media client device and the media server device for delivery of the media stream, wherein the media stream comprises a series of media segments each requested from the media server device by the media client device and delivered from the media server device to the media client device via the digital network; receiving a user instruction by the media player device to pause playback of a media stream delivered via the media streaming connection; in response to the user instruction, the media player device notifying the media server device of the paused playback via the media streaming connection; receiving, by the media player device, one or more dummy media segments to thereby continue activity on the media streaming connection while the playback of the media stream remains paused; and discarding the dummy media segment by the media player device.

Various additional examples, aspects and other features are described in more detail below.

BRIEF DESCRIPTION OF THE DRAWING FIGURES

Example embodiments will hereinafter be described in conjunction with the following drawing figures, wherein like numerals denote like elements.

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

According to various example embodiments, dummy media segments are transmitted across a previously-established media streaming connection to prevent inactivity that could otherwise lead to interruption of the connection. The HTTP Live Streaming (HLS) protocol developed by Apple Inc., for example, appears to disconnect when no activity occurs for about thirty seconds or so. If a viewer pauses playback of a media stream for a longer period of time, then, the HLS connection between the media client and media server could be terminated, thereby leading to confusion and delay as the connection is re-established. Other media streaming protocols (e.g., MPEG-DASH, HTML-5, HTTP Dynamic Streaming (HDS), Microsoft Smooth Streaming (MSS) and/or the like) can exhibit similar behaviors. The concepts described herein may therefore be equivalently applied to any media streaming protocol or standard that uses client-requested media segments transmitted across a virtual connection.

Figure 1:
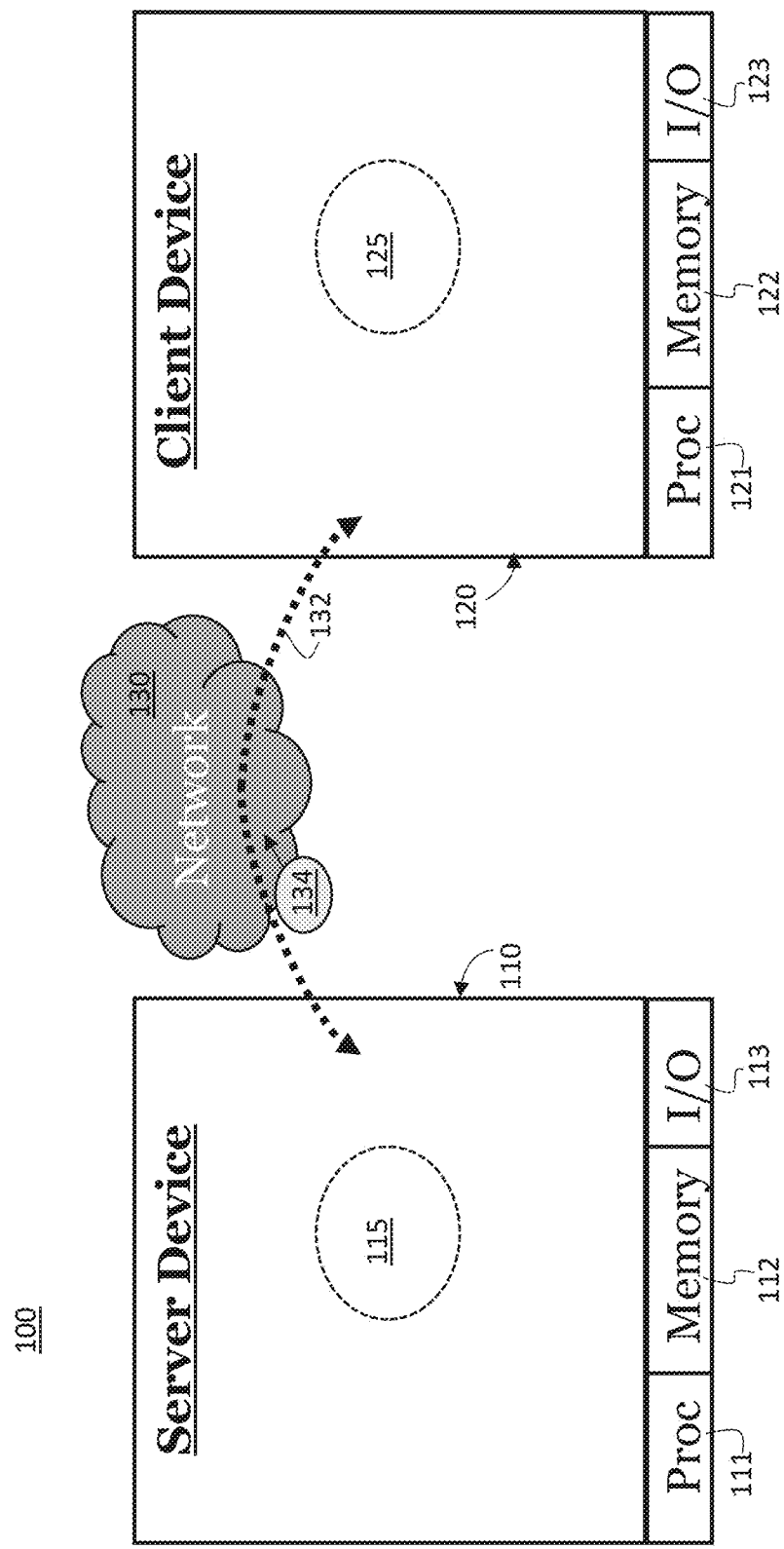
FIG. 1 illustrates an example of a data processing system in which devices maintain a video streaming connection even during periods of relative inactivity through the transmission and delivery of dummy media segments.

FIG. 1 shows an example system 100 in which a media client device 120 obtains an adaptive media stream from a media server device 110 via a connection 132 established via a digital network 130. In this example, connection 132 is a media streaming connection established via a media streaming protocol such as HLS, MPEG-DASH, MSS, HDS and/or the like. Typically, these media streaming protocols use hypertext transport protocol (HTTP) messages transmitted across transmission control protocol (TCP) and/or user datagram protocol (UDP) sessions to request and deliver small media segments that are individually playable by the media player. The media streaming protocols therefore operate at the application layer, or at least a higher OSI layer than the underlying HTTP, TCP and internet protocol (IP) structures used to deliver data between client device 120 and server device 110. Often, these higher-level protocols require the use of proprietary software, and/or otherwise restrict configurability for certain applications. Put another way, limitations of media streaming protocols can pose substantial challenges due to the lack of any ability to design around such limitations. The relatively short timeout period identified in HLS, for example, appears to be inherent in the protocol, with no ability to adapt without sacrificing compatibility with the protocol. Nevertheless, the short timeout period makes pausing or temporarily halting playback highly annoying to the viewer. The dummy packets 134 described herein can help remedy this annoyance while retaining full compatibility with the protocol.

Devices 110 and 120 may be any sort of computing systems that are able to communicate on network 130. "Server" and "client" devices described herein are any network-enabled computing devices each operating under the control of computing hardware, such as any sort of processor 111/121, digital storage (e.g., solid state memory, or any sort of magnetic or optical storage) 112/122 and input/output interfaces (e.g., network interfaces, interfaces to displays or input devices, etc.) 113/123. Such devices will also incorporate an operating system or the like that allows applications to make use of the device's hardware resources to perform various tasks and functions. A media server application 115, for example, may be implemented using computer-executable instructions that are stored in memory 112, a disk drive and/or another non-transitory mass data storage for automatic execution by the processor 111. Similarly, a client application 125 residing in non-transitory data storage 122 on the client may be executed by the client's processor 121 to request and/or process dummy segments 134 received from the server device 110, as described more fully herein. Other embodiments could be formulated in any number of alternate but equivalent embodiments.

In various embodiments, media client device 120 is a mobile telephone, tablet, computer system, video game player, smart television, media streaming device, or other media device as desired. Media server device 110 can be implemented as a placeshifting device in some examples: such a placeshifting device could be implemented within a digital video recorder or television receiver, for example, or could be implemented as a standalone placeshifting device as desired. Other embodiments could implement server device 110 as a digital video recorder, video game player, file server, personal computer and/or other device capable of supplying media streams via network 130. Still other embodiments could implement server device 130 as a video on demand (VOD) server, IPTV server, remote storage digital video recorder (RSDVR), networked placeshifting device, cloud-type server and/or other server device based upon physical and/or cloud-type hardware, as desired.

Network 130 is any sort of local area network (LAN), wide area network (WAN) or the like that is capable of supporting data communications with any number of media server and/or client devices 110, 120. Network 130 may include the Internet, any telephony networks, any sort of private or public networks, and/or any other wired and/or wireless networks, as desired. In various embodiments, devices 110 and/or 120 access network 130 via one or more "ETHERNET" type networks (see IEEE 802.11 standards), one or more "WIFI" or similar wireless networks (see IEEE 802.4 standards), one or more multimedia over coaxial cable (MoCA) networks, and/or the like. Equivalent embodiments could use any other wireless and/or wired network topologies or standards that support multiple nodes using any sort of address scheme.

Figure 2:
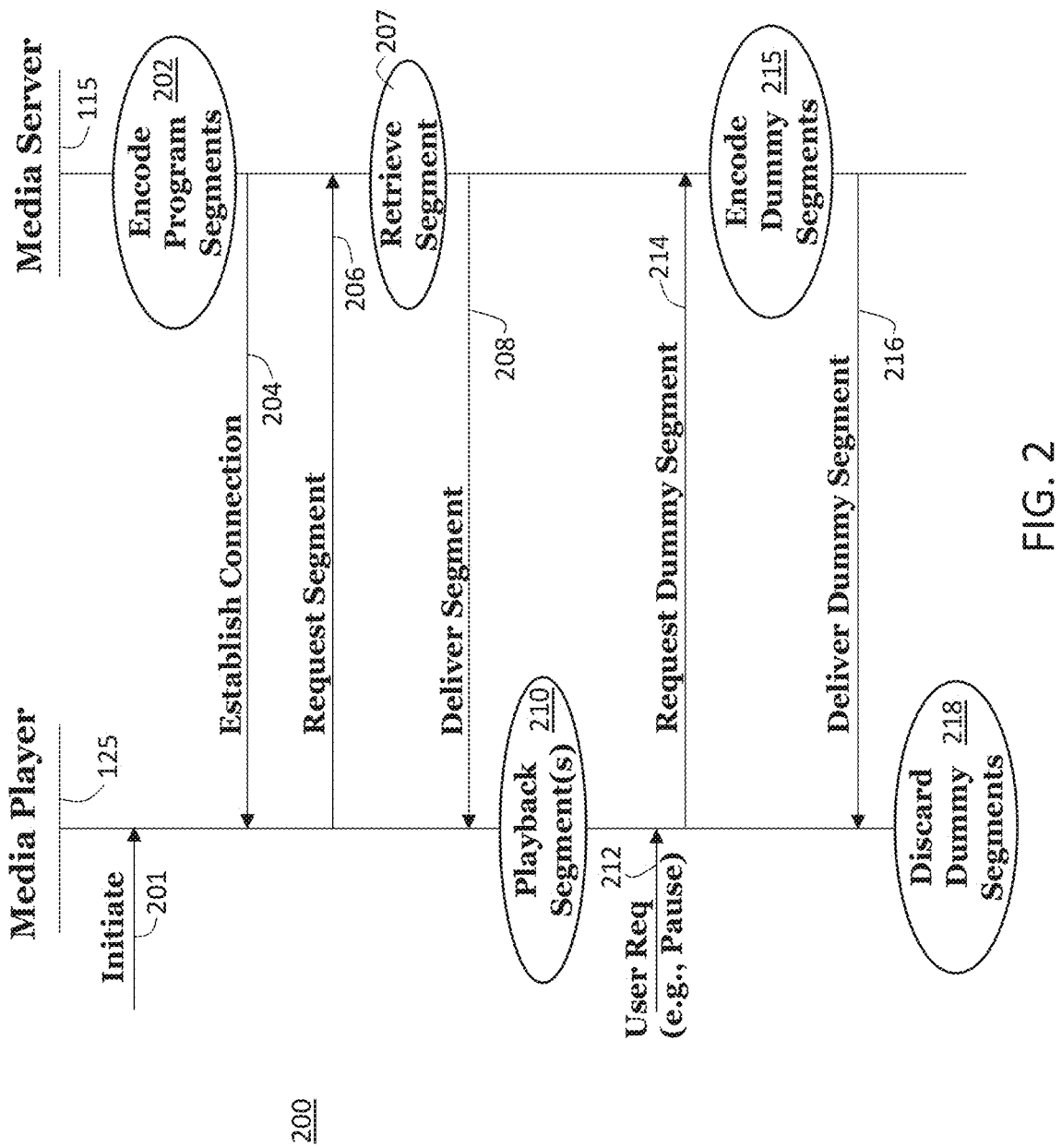
FIG. 2 is a diagram showing various example processes to maintain a media streaming connection even during periods of relative inactivity through the transmission and delivery of dummy media segments.

FIG. 2 is a diagram showing various automated processes 200 executed by devices 110 and 120 to communicate via network 130. The various functions and messages shown in FIG. 2 are typically implemented by computing hardware within the device 110 and/or 120, as appropriate, typically under the control of programmed software and/or firmware logic that can be stored in memory or other non-transitory storage of the device.

As shown in the example of FIG. 2, media player 125 suitably establishes connection 132 with media server application 115 (function 204) after initialization 201. In various embodiments, initialization 201 involves activation of the player application 125 by the user, although other embodiments could activate the player application 125 and/or establish connection 132 in any other manner. Connection 132 may be established at system startup in some implementations. Other embodiments could initiate connection 132 in response to user instructions, and/or otherwise as desired.

The details connection 132 will typically be defined by the media streaming protocol (e.g., HLS or the like) as desired. Often, connection 132 is a connection-based structure based upon TCP protocols, with individual messages being transmitted using secure (or unsecure, if desired) hypertext transport protocol (HTTP/HTTPS) structures, such as "GET" and "PUT" structures.

Media server device 130 will typically encode, or at least maintain in storage, some media content for delivery to player devices 120 (function 202). Encoding may take place prior to streaming, as in the case of a VOD server or the like. Alternately, streaming content could be "live encoded" from received or stored raw video in real time (or near real time, accounting for some delay inherent in data processing and transmission), as desired. Many "placeshifting" applications perform live encoding of video content during the streaming session so that the quality of the transmitted video is adapted to remain appropriate for changing then-current network conditions and player capabilities. Although FIG. 2 describes encoding 202 as taking place prior to establishment of connection 132, then, this may not be the case in all embodiments. That is, any sort of live encoding or transcoding could be equivalently used.

In many modern adaptive media streaming implementations, video content is encoded into a sequence of media segments that each last on the order of a few seconds or so (e.g., 3-10 seconds). These segments are then requested (function 206) by the client device (e.g., using HTTP "GET" constructs). Server device 110 receives request 206, retrieves the requested segment from storage (function 207) and delivers the requested segment to the player device 120 (function 208) using HTTP "PUT" statements or the like. The player device 120 decodes the data in the received media segments and renders the decoded content for playback as appropriate (function 210).

Occasionally, a viewer of the media stream may pause media playback, or otherwise indicate that playback should be temporarily halted (function 212). As noted above, pauses lasting more than about thirty seconds could result in the underlying streaming protocol (e.g., HLS) incorrectly interpreting the lack of media transmission as an intent to discontinue the stream and disconnect connection 132 to the media player 120. To prevent this, one or more "dummy" media segments 134 can be requested 214 and/or delivered 216 via the connection 132. By continuing even "dummy" traffic on the connection, the protocol is appeased, and connection 132 is allowed to continue. The dummy segments 134 can be ignored by the media player 125, or otherwise processed as desired (function 218). Requests and/or delivery of dummy segments 134 can be repeated at appropriate time frequencies (e.g., every 25 seconds or so) to prevent disconnection until the playback is continued. At that point, requesting and receiving of "regular" content-bearing media segments can resume.

Dummy segments may be processed in any manner. In the implementation illustrated in FIG. 2, the player device 120 reacts to the user's pause instruction 212 by affirmatively and automatically requesting the dummy segments 132. In other embodiments, the player device 120 may simply indicate to the server (via in-band or out-of-band messaging) that the playback is paused, and the server 120 will then transmit only dummy segments until notified that playback is resuming. In still other embodiments, the server 110 could default to transmitting "dummy" segments 134 whenever no request is received within an expected period of time. In the latter case, server 110 would typically timeout at some point, but after a longer period of time than would be expected for a routine pause operation (e.g., on the order of ten minutes or so, although any other values could be used).

The dummy segment 132 may be previously-encoded by the media server 110 prior to use, or the segment 132 may be created "on the fly", as appropriate (function 215). The dummy segment may be designed as a "low bandwidth" segment having as little data as possible to reduce bandwidth consumption on connection 132. Images may be highly compressible (e.g., entirely composed of the same pixel values), if desired, and "dummy" images may be designed so that they do not vary from frame to frame, thereby leading to very efficient compression of the video imagery in the dummy segment. Dummy segments 134 will otherwise be formatted to be compatible with the media streaming protocol (e.g., HLS), however, to prevent any other errors from being generated.

Because "dummy" media segments 134 are formatted as legitimate media segments compatible with the underlying streaming protocol, the protocol should not terminate the connection 132 so long as the segments 134 are being transmitted. This allows for pausing of the video playback without discontinuing the media streaming connection, as appropriate. Various embodiments may supplement or modify this concept in any manner.

"Dummy" segments 134 may be formatted in any manner (function 215). In general, the dummy segments 134 will be formatted in accordance with the underlying media protocol (e.g., HLS or the like), but with highly compressible data. Different forms of highly compressible data may include substantial amounts of redundancy (e.g., duplicate images and/or duplicate pixel values within images) that can support highly efficient data compression. In an example embodiment, the moving video can be encoded as a series of identical imagery. Alternately and/or additionally, the content of individual images can be made more compressible by using identical pixel values (e.g., an image that is simply a blank image, or an image that includes only pixels having a predetermined color, luminance, variance, etc.).

Once again, "dummy" segments may be affirmatively requested by the player (e.g., with an express HTTP "GET" statement sent via connection 132 to provoke a response from server 110), and/or server 110 may be configured to "push" dummy segments 134 across connection 132 when no other queries are received for an appropriate time without a disconnect or end notice received from the player. In still other embodiments, the player could provide one "pause" notification to the server device 110, which would then automatically send "dummy" packets 134 at appropriate intervals to avoid disconnection until subsequent notice (or more specific media requests) are received from the media player device 120. Again, any number of alternate but equivalent configurations could be created using the concepts of dummy packets to prevent timeout.

Although the network environment is often described herein as a "home" environment, equivalent concepts could be applied to offices, schools, factories, restaurants and bars, and/or any number of other environments that make use of media streaming connections across one or more digital networks. Moreover, the concepts described herein with respect to media streaming could be equivalently applied for other applications or purposes, such as internet television (IPTV), video gaming, time and/or place shifting, home or office control, file or print sharing and/or any other applications as desired. Note that reference is occasionally made herein to "AirTV", "AirTV Classic", "AirTV Classic Box", "Hopper" and/or "SlingBox" devices that are available from Dish Network of Englewood, Colorado. These references are simply examples, however, and equivalent concepts could be implemented in any number of other devices or systems, as noted herein.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A media player device to play a current media stream received from a media server device via a digital network, the media player device comprising a processor, non-transitory data storage and an interface to the digital network, wherein the non-transitory data storage is configured with computer-executable instructions that, when executed by the processor, perform an automated process comprising:
   establishing a transmission control protocol (TCP) connection via the digital network between the media client device and the media server device for delivery of the current media stream, wherein the current media stream comprises a series of media segments each requested from the media server device and delivered to the media client device via hypertext transport protocol (HTTP) messages sent via the TCP connection;
   receiving a user instruction by the media player device to pause playback of a media stream delivered via the media streaming connection;
   in response to the user instruction, the media player device placing a series of requests at different times for one or more dummy media segments of the current media stream from the media server via the TCP connection while the playback of the media stream remains paused, wherein each of the one or more dummy media segments is made up of highly compressible media content to thereby reduce bandwidth while maintaining the current media stream to thereby prevent timeout of the TCP connection;
   receiving, by the media player device, the one or more dummy media segments in response to the series of requests; and
   discarding the one or more dummy media segments by the media player device.

2. The media player device of claim 1 wherein the highly compressible media content comprises a series of identical still images.

3. The media player device of claim 2 wherein each of the identical still images is composed of identical pixels.

4. The media player device of claim 1 wherein the HTTP connection is an HTTP Live Streaming (HLS) connection, and wherein the one or more dummy media segments are encoded in accordance with HLS.

5. An automated process performed by a media server device to provide a current media stream to a media player device via a digital network, the automated process comprising:
   initially establishing a transmission control protocol (TCP) connection via the digital network between the media client device and the media server device for delivery of the current media stream, wherein the current media stream comprises a series of media segments each requested from the media server device and delivered to the media client device via hypertext transport protocol (HTTP) messages sent via the TCP connection;
   receiving requests from the media player device via the TCP connection for one or more dummy media segments of the current media stream from the media server via the TCP connection while playback of the current media stream by the media playback device is paused, wherein the requests comprise a series of requests that are placed by the media player device at different times while playback of the current media stream by the media playback device remains paused; and
   providing, in response to the requests, the one or more dummy media segments via the HTTP connection, wherein each of the one or more dummy segments of the current media stream is made up of highly compressible media content to thereby reduce bandwidth consumed while preventing timeout of the TCP connection between the media client device and the media server device while the playback of the current media stream by the media playback device is paused.

6. The automated process of claim 5 wherein the highly compressible media content comprises a series of identical still images.

7. The automated process of claim 6 wherein each of the identical still images is composed of identical pixels.

8. The automated process of claim 5, wherein the HTTP connection is an HTTP Live Streaming (HLS) connection, and wherein the dummy segment is a media segment encoded in accordance with HLS.

9. A media server device to provide a current media stream to a media player device via a digital network, the media server device comprising a processor, a non-transitory data storage and an interface to the digital network, wherein the non-transitory data storage comprises computer-executable instructions that, when executed by the processor, perform an automated process comprising:
   initially establishing a transmission control protocol (TCP) connection via the digital network between the media client device and the media server device for delivery of the current media stream, wherein the current media stream comprises a series of media segments each requested from the media server device and delivered to the media client device via hypertext transport protocol (HTTP) messages sent via the TCP connection;
   receiving requests from the media player device via the TCP connection for one or more dummy media segments of the media stream from the media server via the TCP connection while playback of the media stream by the media playback device is paused, wherein the requests comprise a series of requests placed by the media player device at different times while playback of the current media stream by the media playback device remains paused; and providing, in response to the requests, the one or more dummy media segments via the HTTP connection, wherein each of the one or more dummy segments of the current media stream is made up of highly compressible media content to thereby reduce bandwidth consumed while preventing timeout of the TCP connection between the media client device and the media server device while the playback of the current media stream by the media playback device is paused.

10. The media server device of claim 9 wherein the highly compressible media content comprises a series of identical still images.

11. The media server device of claim 10 wherein each of the identical still images is composed of identical pixels.

12. The media server device of claim 9, wherein the HTTP connection is an HTTP Live Streaming (HLS) connection, and wherein the dummy segment is a media segment encoded in accordance with HLS.

* * * * *